Feb. 24, 1959   D. B. BROWNE ET AL   2,874,849
FILTER FOR FILTRATION OF FLUIDS
Filed Aug. 24, 1955   3 Sheets-Sheet 1

Inventors
Donald Bennion Browne, &
Kenneth Ernest Buckman
By
H. E. Jones
Attorney

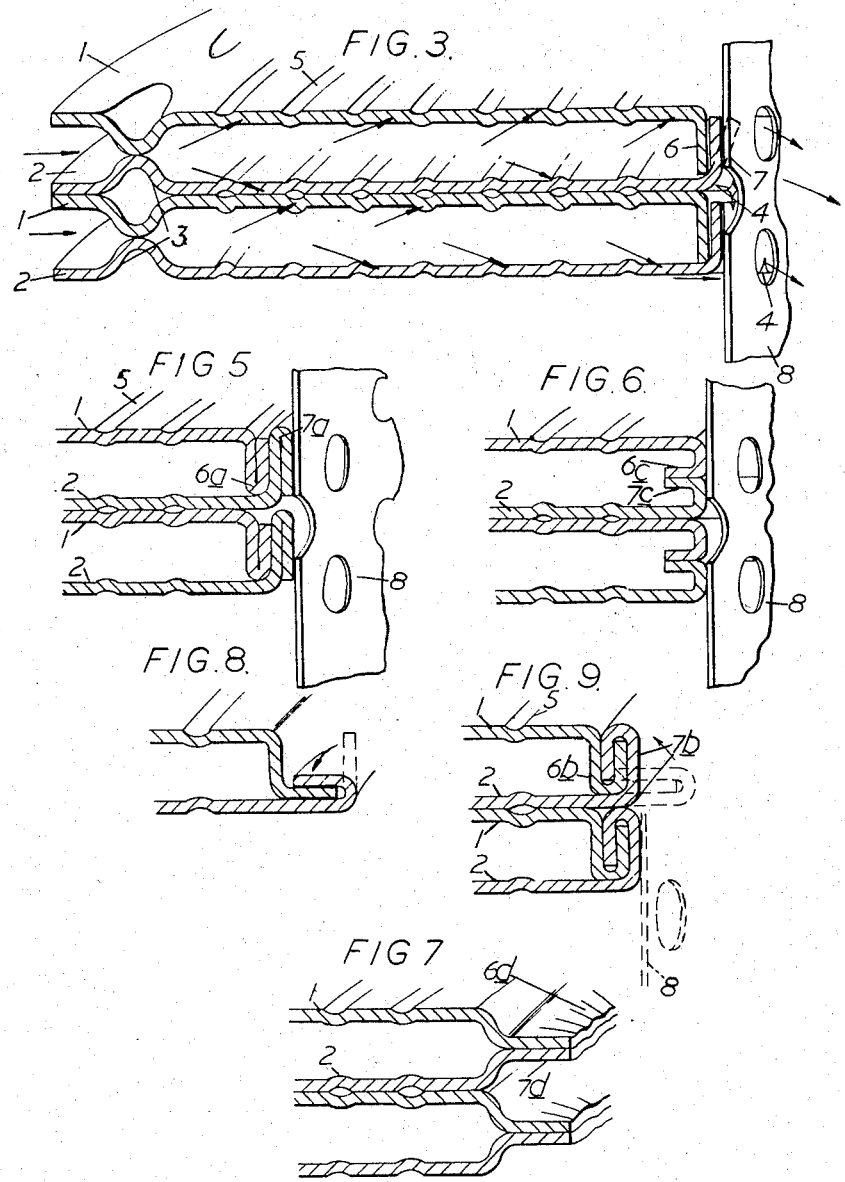

Feb. 24, 1959    D. B. BROWNE ET AL    2,874,849
FILTER FOR FILTRATION OF FLUIDS
Filed Aug. 24, 1955    3 Sheets-Sheet 3

Inventors
Donald Bennion Browne, &
Kenneth Ernest Buckman
By
H. E. Jones
Attorney

United States Patent Office 2,874,849
Patented Feb. 24, 1959

2,874,849
FILTER FOR FILTRATION OF FLUIDS

Donald Bennion Browne, Bassett, Southampton, and Kenneth Ernest Buckman, Redbridge, Southampton, England, assignors to General Motors Corporation, Detroit, Mich., a corporation of Delaware Application August 24, 1955, Serial No. 530,382

Claims priority, application Great Britain September 9, 1954

3 Claims. (Cl. 210—347)

This invention relates to the filtration of fluids, and is particularly concerned with filters for that purpose incorporating sheet filter material.

Filters according to this invention are of particular utility for the filtration of oil, but may also be employed for the filtration of air.

A filter element according to the invention is formed of two centrally apertured discs of permeable material the outer peripheries of which are formed with integral spacing members and the inner peripheries of which are formed with integral flanges parallel or substantially at right angles to the plane of the sheet, so that when two discs are placed face to face under axial pressure they are spaced by the abutment of the spacing members and flanges and are in sealing contact at their inner peripheries.

A filter unit is formed by arranging a plurality of such elements in a stack, for example by stacking them on a central perforate tube, or arranging them in a perforated tubular container, and applying axial pressure to the stack to bring the spacing members and flanges into abutment to space the discs of each element apart at their inner and outer peripheries, and seal them at their inner peripheries, whilst the adjacent discs of adjacent elements are brought into sealing contact at their outer peripheries.

The scope of the invention is indicated in the appended claims; and how it can be carried into effect is hereinafter particularly described with reference to the accompanying drawings, in which:

Fig. 3 is a detail, in section and to a larger scale, showing two of the filter elements on a drainage tube;

Figs. 5, 6 and 7 are views similar to Fig. 3 but showing an alternative formation of the inner flanges of the filter elements;

Figs. 8 and 9 show two stages in the formation of different inner flanges on a filter element;

Figure 14:
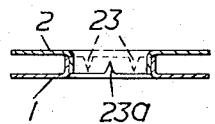
Figure 15:
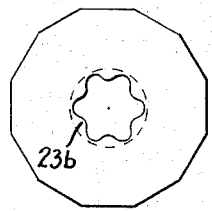

Fig. 14 shows the assembly of the two discs shown in Figs. 10 and 12, and 11 and 13; and Fig. 15 shows a further alternative formation of the inner flanges of the discs of the filter element.

The filter elements illustrated are made of permeable sheet material, such as paper or other fibrous material which has been impregnated with a synthetic resin so as to increase its strength without undesirably affecting its filtration properties.

Figure 1:
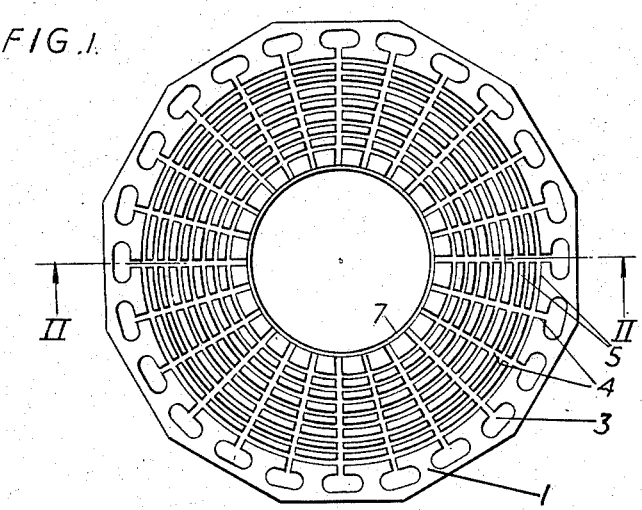
Fig. 1 is a plan of a filter element according to the invention.
Figure 2:
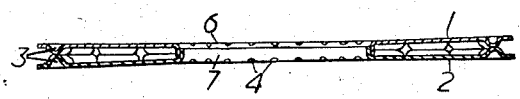
Fig. 2 is a view on the line 2—2 of Fig. 1.

As shown in Figs. 1 to 3 a filter element according to the invention is formed of two discs 1 and 2 of such material, each disc being formed with a similar series of spaced dimples 3 adjacent its outer periphery to space the two discs of each element, and with radial grooves 4 and intersecting circular grooves 5, to facilitate free flow of filtered fluid between adjacent discs of adjacent elements, as hereinafter described.

The inner peripheral parts of the discs 1 and 2 are formed with flanges 6 and 7 respectively, which are preferably at substantially 90° to the plane of the sheet, but (as shown in Figs. 6 and 7) may be partly parallel to the plane of the sheet. In either event, these flanges may be described as being cylindrical.

The inner diameter of the upper disc 1 of the elements shown in Fig. 2 is slightly greater than that of the lower disc 2 so that the flanges 6 and 7 fit one within the other when the two discs are placed together as shown to form a filter element, the flanges 6, 7 abutting to space the discs of the element at the central portions and the dimples 3 abutting to space the discs at their outer peripheries.

Figure 4:
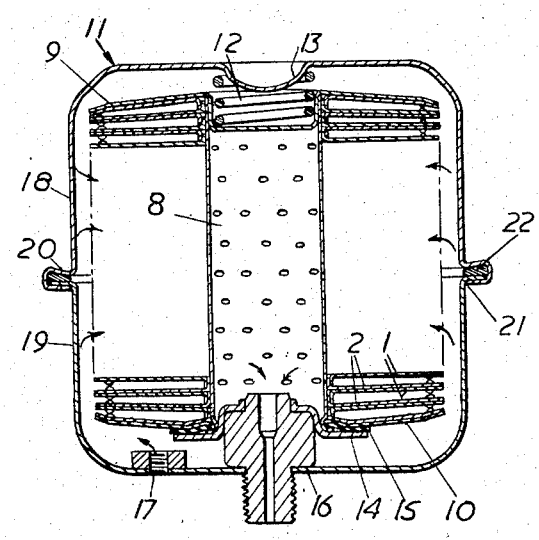
Fig. 4 is a sectional elevation of a filter embodying a plurality of the filter elements, shown in Figs. 1 to 3.
Figure 10:
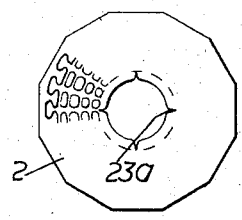
Figs. 10 and 11 are plans of the two discs which form a filter element, illustrating a further alternative formation of the flanges.
Figure 11:
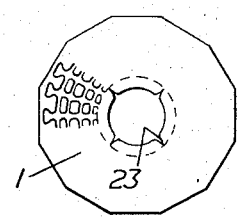
Figure 12:
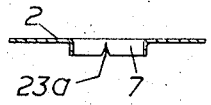
Figs. 12 and 13 are sections respectively of Figs. 10 and 11.
Figure 13:
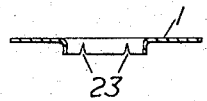

As shown in Figs. 3 and 4, in order to form a filter unit, a plurality of the elements shown in Fig. 2 are stacked on a central perforated tube 8 whereby the flanges 6, 7 are brought more effectively into sealing contact, as shown in the upper of the two elements in Fig. 3, the dotted line indicating the position of the flange 7 before the element is placed on the tube. The sealing effect is assisted by the pressure of the fluid during filtration.

The elements are preferably formed so as to have a slight clearance on the central tube 8 on which they are to be mounted, axial compression applied to the elements upon final assembly on the tube causing the elements to tighten on the latter. Such initial clearance, which may be of say .020″ also facilitates assembly of the elements on the tube.

As shown in Fig. 4 the axially compressed assembly of elements may be secured on the tube 8 by means of end plates 9 and 10 secured to the tube; the filter unit thus formed is held in a filter housing 11 by means of a spring 12, one end of which abuts a seat 13 at one end of the filter housing 11 and the other of which abuts a centrally recessed portion of the end plate 9. The other end of the stack of elements bears against metal washer 14 with the interposition of a sealing washer 15, the washer 14 being secured on a centrally bored plug 16 which constitutes the outlet of the filter and is sealed into the casing 11. An inlet for liquid to be filtered is shown at 17.

As shown, the casing may be formed of two metal pressings 18, 19, having flanges 20 and 21 respectively, the two pressings 18, 19 being sealed together by crimping the flange 20 over the flange 21 and an interposed sealing washer 22.

As shown in Figs. 3 and 4 the axial pressure applied to the stack of filter elements causes adjacent discs of adjacent elements to be brought into sealing contact at their outer peripheries, the two discs of each element being spaced apart at their outer peripheries by the dimples 3 and at their inner peripheries by the flanges 6 and 7. Liquid to be filtered passes through the material of the discs 2 and 1 of adjacent elements and then passes between the adjacent discs of the adjacent elements by way of the intersecting filtrate passages or radial circular grooves 4 and 5 in each disc to the inner periphery of the element, and thence by way of the apertures in the drainage tube 8 to the outlet 16 of the filter.

The discs shown are twelve sided but may be of circular or other polygonal shape. Also the discs may be axially aligned in a stack by enclosing them in an appropriately shaped perforated tubular container instead of being arranged on a central tube.

Optionally, adhesive can be used to assist in sealing the flanges 6, 7 together.

Each disc can be formed with flanges 6a, 7a of double thickness as shown in Fig. 5, by bending the outer part of each of the flanges back on itself.

Alternatively, as shown in Figs. 8 and 9 the discs can be formed with flanges 6b, 7b of U-section in which the two legs of the U are spaced one from the other, the flanges being formed simultaneously in the two discs 1, 2 of an element so that one leg of the U-shaped flange of each disc enters and is held between the two legs of the U-shaped flange of the other disc. The successive stages in forming such flanges are shown in Figs. 8 and 9 respectively by the dotted and full lines and the arrows.

The discs can, in a further alternative be formed with flanges 6c, 7c having an inner part substantially at 90° to the disc and an outer part parallel to the disc so that the outer parallel parts of the flanges of each pair of discs abut when the two discs 1, 2 are put together to form an element. The outer parallel parts of the flanges can be sealed by endwise pressure, adhesive, mechanical clamping or crimping, or any combination thereof; and the outer parallel parts of the flanges can project inwardly of the discs, as shown at 6c, 7c in Fig. 6, or outwardly of the discs, as shown at 6d, 7d in Fig. 7.

It is advantageous, in forming the filter element discs 1, 2 having the inner peripheral flanges thereon at right angles to the plane of the disc, to form each disc with a plurality of radial indentations 23 or 23a (Figs. 10 to 14) in the flange portion of the disc before it is bent at right angles thereto.

In forming an element one sheet is then placed on top of the other so that the flanges 6, 7 interfit with the indentations 23 in one non-coincident with the indentations 23a of the other.

Where the sheets have a polygonal external contour as shown, the indentations 23 in one sheet are cut at different positions, relative to the sides of the polygon, from the indentations 23a, so that when the two sheets of each element are in register the sets of indentations 23 and 23a are non-coincident.

The indentations may be in the form of slits or notches, as shown in Figs. 10 to 14, or in the form of a series of undulations or scallops 23b, equispaced about the inner periphery of the sheet, as shown in Fig. 15.

When the flanges 6, 7 are bent at right angles to the plane of the sheets 1, 2 the angular or curvilinear indentations 23, 23a or 23b will prevent splits forming in the flange, or will ensure that splits in the flange occur at predetermined positions, namely, at the locations of the said indentations, whereby the two sheets of an element can be arranged so that the splits therein will not coincide; thus the seal formed by the interfitting flanges will be maintained.

Such a formation of the flanges on the sheets is of particular benefit in cases in which the sheet material has a low stretch factor, as in material which may be employed in an air filter.

We claim:

1. A filter comprising a stack of filter elements with a common axis, each of said elements comprising two sheets of permeable fibrous material, a cylindrical flange integral with each of said sheets to define a central aperture, the cylindrical flanges of each element extending in opposite directions and arranged in telescopic relation, the faces of adjacent elements being in contact to define between them filtrate passages with closed ends beginning near the peripheries of said elements and extending to the apertures of said sheets and said passages being arranged in series around said axis.

2. A filter comprising a stack of filter elements, each element comprising two sheets of permeable fibrous material, spacer dimples formed on the margins of said two sheets and cooperating to space the peripheries of said sheets for the reception of fluid from the exterior of said stack, a cylindrical flange integral with each of said sheets to define a central aperture, the cylindrical flanges of each element being arranged in telescopic relation, and the faces of adjacent elements cooperating to define filtrate passages closed near the peripheries of said elements and extending inwardly to communicate with the apertures of said sheets.

3. A filter comprising a stack of filter elements, each element comprising two sheets of permeable fibrous material, a cylindrical flange integral with each of said sheets to define a central aperture, the cylindrical flanges of each element extending in opposite directions and arranged in telescopic relation, the faces of adjacent elements being in contact to define filtrate passages with closed ends near the peripheries of said elements, said passages extending to the apertures of said sheets, and means including a perforated tube extending through said apertures for holding said stack in assembly on a common axis and receiving filtrate from said elements by way of said passages.

References Cited in the file of this patent

UNITED STATES PATENTS

| | | |
|---|---|---|
| 984,704 | Rarick | Feb. 21, 1911 |
| 2,359,475 | Gauthier | Oct. 3, 1944 |
| 2,547,941 | Heftler | Apr. 10, 1951 |
| 2,583,423 | Halliman | Jan. 22, 1952 |
| 2,591,056 | Ericson | Apr. 1, 1952 |
| 2,696,914 | Conley | Dec. 14, 1954 |

FOREIGN PATENTS

| | | |
|---|---|---|
| 281,838 | Germany | Feb. 2, 1915 |
| 827,351 | Germany | 1952 |
| 436,939 | Italy | July 18, 1948 |